US 8,312,369 B2

(12) United States Patent
Takahashi et al.

(10) Patent No.: US 8,312,369 B2
(45) Date of Patent: Nov. 13, 2012

(54) INFORMATION DISPLAY APPARATUS, METHOD, AND RECORDING MEDIUM FOR SAVING AND DISPLAYING NOTE INFORMATION IN ASSOCIATION WITH CONTEXTUAL INFORMATION

(75) Inventors: Eiichi Takahashi, Kawasaki (JP); Tatsuro Matsumoto, Kawasaki (JP); Masayuki Fukui, Kawasaki (JP); Ai Yano, Kawasaki (JP); Masahiro Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 526 days.

(21) Appl. No.: 12/561,787

(22) Filed: Sep. 17, 2009

(65) Prior Publication Data
US 2010/0077291 A1   Mar. 25, 2010

(30) Foreign Application Priority Data
Sep. 25, 2008   (JP) .................. 2008-246147

(51) Int. Cl.
G06F 17/00 (2006.01)
(52) U.S. Cl. ....................................... 715/230
(58) Field of Classification Search .............. 715/230
See application file for complete search history.

(56) References Cited

U.S. PATENT DOCUMENTS

| | | | |
|---|---|---|---|
| 6,279,014 B1* | 8/2001 | Schilit et al. | 715/234 |
| 6,549,915 B2* | 4/2003 | Abbott et al. | 1/1 |
| 7,028,253 B1* | 4/2006 | Lieberman et al. | 715/232 |
| 7,966,352 B2* | 6/2011 | Madan et al. | 707/821 |
| 7,987,416 B2* | 7/2011 | Loeser et al. | 715/200 |
| 2002/0076109 A1* | 6/2002 | Hertzfeld et al. | 382/229 |
| 2003/0070139 A1* | 4/2003 | Marshall et al. | 715/512 |
| 2004/0021685 A1* | 2/2004 | Denoue et al. | 345/721 |
| 2005/0055628 A1 | 3/2005 | Chen et al. | |
| 2005/0091578 A1* | 4/2005 | Madan et al. | 715/512 |
| 2006/0075205 A1* | 4/2006 | Martin et al. | 711/200 |
| 2006/0143560 A1* | 6/2006 | Gupta et al. | 715/512 |
| 2006/0147117 A1* | 7/2006 | Wakeam et al. | 382/186 |
| 2006/0150079 A1* | 7/2006 | Albornoz et al. | 715/512 |
| 2006/0265640 A1* | 11/2006 | Albornoz et al. | 715/512 |
| 2007/0174407 A1* | 7/2007 | Chen et al. | 709/207 |
| 2007/0214407 A1* | 9/2007 | Bargeron et al. | 715/512 |
| 2007/0300142 A1* | 12/2007 | King et al. | 715/500 |
| 2009/0044144 A1* | 2/2009 | Morris | 715/804 |
| 2009/0055737 A1* | 2/2009 | Borchardt et al. | 715/708 |
| 2009/0063948 A1* | 3/2009 | Finn et al. | 715/230 |

FOREIGN PATENT DOCUMENTS

| | | |
|---|---|---|
| JP | 2005-18442 | 1/2005 |
| JP | 2005-85285 | 3/2005 |
| JP | 2006-113976 | 4/2006 |

* cited by examiner

Primary Examiner — Laurie Ries
Assistant Examiner — Mustafa Amin
(74) Attorney, Agent, or Firm — Fujitsu Patent Center

(57) ABSTRACT

An apparatus includes a context information extracting part that monitors a state of the apparatus and extracts context information indicative of the state; a note information saving part that saves note information in association with context information when the note information for displaying is registered; a context information similarity evaluating part that determines, for each piece of the note information, similarity between the context information extracted by the context information extracting part at a certain point in time and context information which is associated with note information saved by the note information saving part; and a note information display part that displays the note information saved in the note information saving part in a display mode in accordance with the determined similarity of the note information.

12 Claims, 22 Drawing Sheets

FIG. 5A

| USER INPUT INFORMATION | AREA | COLOR |
|---|---|---|
| NOTE-1 | (10,20)-(60,40) | YELLOW |

FIG. 5B

| USER INPUT INFORMATION | COORDINATE | WIDTH | HEIGHT | R | G | B | FONT |
|---|---|---|---|---|---|---|---|
| NOTE-1 | (10,20) | 50 | 20 | 255 | 255 | 0 | MSP GOTHIC |

FIG. 11

| WINDOW | NUMBER OF LINKS |
|--------|-----------------|
| w-1    | 1               |
| w-2    | 5               |
| w-3    | 100             |

INFORMATION DISPLAY APPARATUS, METHOD, AND RECORDING MEDIUM FOR SAVING AND DISPLAYING NOTE INFORMATION IN ASSOCIATION WITH CONTEXTUAL INFORMATION

CROSS-REFERENCE TO RELATED APPLICATIONS

This application is based upon and claims the benefit of priority of the prior Japanese Patent Application No. 2008-246147, filed on Sep. 25, 2008, the entire contents of which are incorporated herein by reference

FIELD

The present invention relates to an information processing technique, and more particularly, to a technique for information retrieval.

BACKGROUND

There are many known software applications for assisting users' memory. For example, there are software applications that provide a personal computer (PC) with the ability to store information input by a user, such as notes, in the form of a text, a file, a link to a Web page, an image or the like, and display the information all the time on a desktop (or a basic operation screen) of a display device. Many of such software applications display information on the desktop to look like sticky notes and this style of display is sometimes called "electronic sticky note".

Software applications are known that cause a PC to function to display an electronic sticky note over a display screen area of a particular file or a Web page on a display device. To use such a software application, a user specifies association of an electronic sticky note with the position of a file or a Web page on a display screen, and the PC stores information on this association along with display information for the electronic sticky note.

A technique is also known that uses an annotation input by a user and context data which is obtained when the annotation is input to search for information relevant to the annotation and also collect context data close to the annotation.

A technique is also known that recognizes input search keys, selects a number of recognition candidates as search keys in descending order of similarity, and adjusts a display mode of the individual recognition candidates based on the degree of similarity when the recognition candidates are displayed.

Examples of the techniques mentioned above include ones disclosed in Japanese Patent Laid-Open Nos. 2006-113976, 2005-85285, and 2005-18442.

When a user frequently uses electronic sticky notes, the number of electric sticky notes that are displayed on a display device at a time will increase. That is to say, because a large quantity of information is simultaneously displayed, there can be problems of missing necessary information and/or an increase in the time and effort for finding necessary information.

To address these problems, such schemes are conceivable as to delete a electric sticky note that is no longer necessary every time there is such a sticky note, to position important electric sticky notes at more conspicuous positions than less important ones, or to set display position for each predetermined group to which electronic sticky notes belong. However, it is generally difficult to correctly judge in advance whether certain information is necessary or unnecessary, how important certain information is, and to which group certain information belongs, and if the judgment is made incorrectly, the convenience of electronic sticky notes would be significantly degraded.

In a method that displays electronic sticky notes over the display screen area of a particular file or a Web page, the increase in the number of electronic sticky notes that results from frequent utilization thereof is reduced. However, the user cannot handle information shown on an electronic sticky note unless the user opens a file or a Web page associated with that electronic sticky note (e.g., unless the user has the file or Web page displayed on the display device). Thus, this method of display has a limited application because it is based on the premise that a file or a Web page associated with an electronic sticky note must be opened when information on the electronic sticky note is needed. The method also cannot handle information of such as "Which file or Web page should be opened to get the necessary information", for example. Furthermore, this style cannot associate an electronic sticky note with multiple combinations of files and/or Web pages. Accordingly, when a "business trip application page" and a "route search page" are concurrently displayed, which indicates that the user is preparing for a business trip, for example, this style cannot provide a function of automatically displaying an electronic sticky note on which "hotel information", e.g., information on accommodation, is shown.

SUMMARY

According to an aspect of the invention, an apparatus includes a context information extracting part that monitors a state of the apparatus and extracts context information indicative of the state; a note information saving part that saves note information in association with the context information which is extracted when the note information for displaying is registered; a context information similarity evaluating part that determines, for each piece of the note information, similarity between the context information extracted by the context information extracting part at a certain point in time and context information which is associated with the note information saved by the note information saving part; and a note information display part that displays the note information saved in the note information saving part in a display mode in accordance with the determined similarity of the note information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5A illustrates a first example of note information data;

FIG. 5B illustrates a second example of note information data;

FIG. 11 illustrates example data of link count information which indicates the number of links for each window screen;

DESCRIPTION OF EMBODIMENTS

Figure 1:
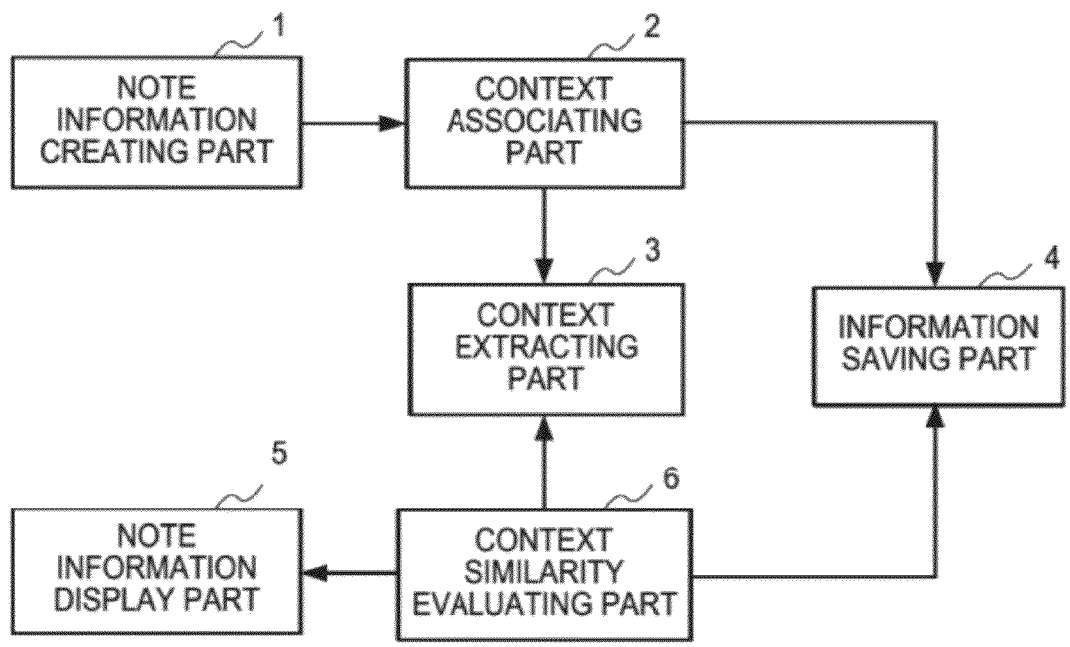
FIG. 1 illustrates a first example of a configuration of an information display apparatus to implement the present invention.

FIG. 1 illustrates a first example of a configuration of an information display apparatus to implement the present invention.

The information display apparatus includes a note information creating part 1, a context associating part 2, a context extracting part 3, an information saving part 4, a note information display part 5, and a context similarity evaluating part 6.

The note information creating part 1 creates note information to be registered with the information display apparatus in accordance with a user's instructions.

The context associating part 2 associates note information created by the note information creating part 1 with context information at a time of registration of the note information which is extracted by the context extracting part 3.

The context extracting part 3 continuously monitors the state (or context) of the information display apparatus and extracts context information indicative of context at certain points in time.

The information saving part 4 saves note information created by the note information creating part 1 along with context information associated by the context associating part 2 and information on the association, and registers the note information with the information display apparatus.

The note information display part 5 displays note information saved in the information saving part 4 in a display mode that is based on the similarity of the note information at a certain point in time which is evaluated by the context similarity evaluating part 6.

The context similarity evaluating part 6 evaluates similarity between context information extracted by the context extracting part 3 at a certain point in time with context information associated with note information which is saved in the information saving part 4, for each piece of note information.

Figure 2:
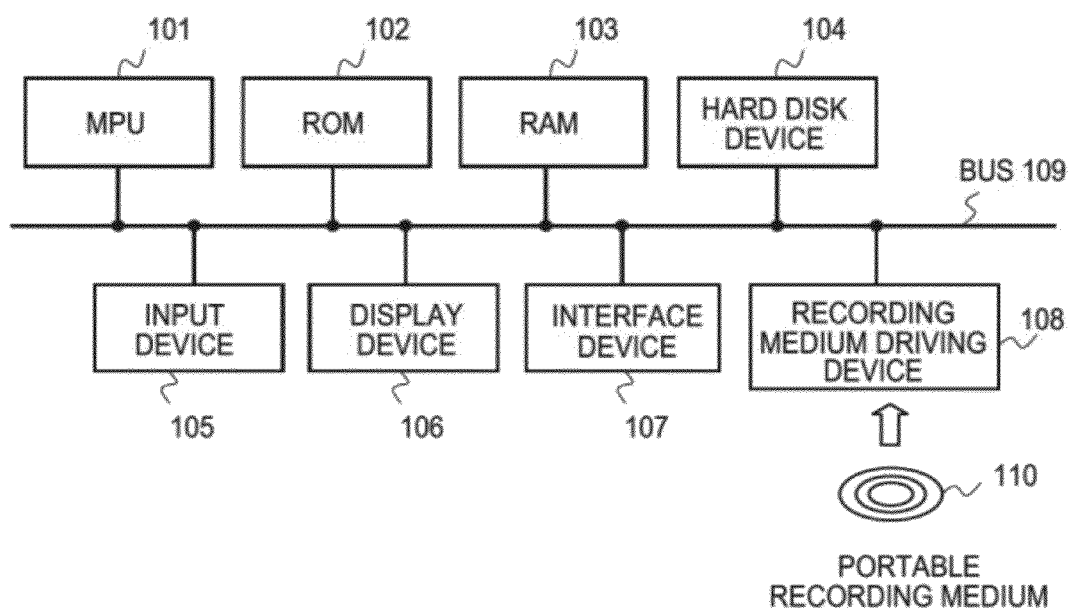
FIG. 2 illustrates an example of a standard hardware configuration of a computer.

The information display apparatus of FIG. 1 uses a computer having a standard hardware configuration. FIG. 2 illustrates an exemplary hardware configuration of such a computer.

The computer of FIG. 2 includes an MPU 101, ROM 102, RAM 103, a hard disk device 104, an input device 105, a display device 106, an interface device 107, and a recording medium driving device 108. The components are all connected to a bus 109 and may exchange various data with each other under the control of the MPU 101.

The MPU (Micro Processing Unit) 101 is a processor device that controls operation of the entire computer.

The ROM (Read Only Memory) 102 is read-only semiconductor memory in which a basic control program is prerecorded. The MPU 101 reads and executes the basic control program during startup of the computer to thereby enable operation control on the components of the computer.

The RAM (Random Access Memory) 103 is semiconductor memory that can be written and read all the time for use as a work storage area as necessary while the MPU 101 executes various control programs.

The hard disk device 104 is a storage device to store various control programs to be executed by the MPU 101 and/or various data, files or the like discussed below. The MPU 101 reads out and executes a certain control program stored in the hard disk device 104 to perform various controls.

The input device 105 may be a keyboard or mouse device, for example, and when operated by the user of the computer, obtains input of various kinds of information from the user, which is associated with the user's operation, and sends the input information to the MPU 101.

The display device 106 may be a liquid crystal display, for example, and displays various text and/or images in accordance with display data sent from the MPU 101.

The interface device 107 manages exchange of various data that is performed via a communication line to which the computer is connected.

The recording medium driving device 108 is a device that reads out various control programs and/or data recorded on a portable recording medium 110. The MPU 101 may also be designed to perform various controls to be discussed below by reading and executing a certain control program recorded on the portable recording medium 110 via the recording medium driving device 108. The portable recording medium 110 may be a CD-ROM (Compact Disc Read Only Memory) or a DVD-ROM (Digital Versatile Disc Read Only Memory), for example.

When the information display apparatus to implement the present invention is configured with such a computer, a control program for the aforementioned components of an information processing apparatus to cause the MPU 101 to perform processing for registration and display operation processes discussed below is created first. The created control program is prestored in the hard disk device 104 or the portable recording medium 110. Then, a specific instruction is given to the MPU 101 to read and execute the control program. Thereby, the computer of FIG. 2 functions as an information display apparatus.

Figure 3:
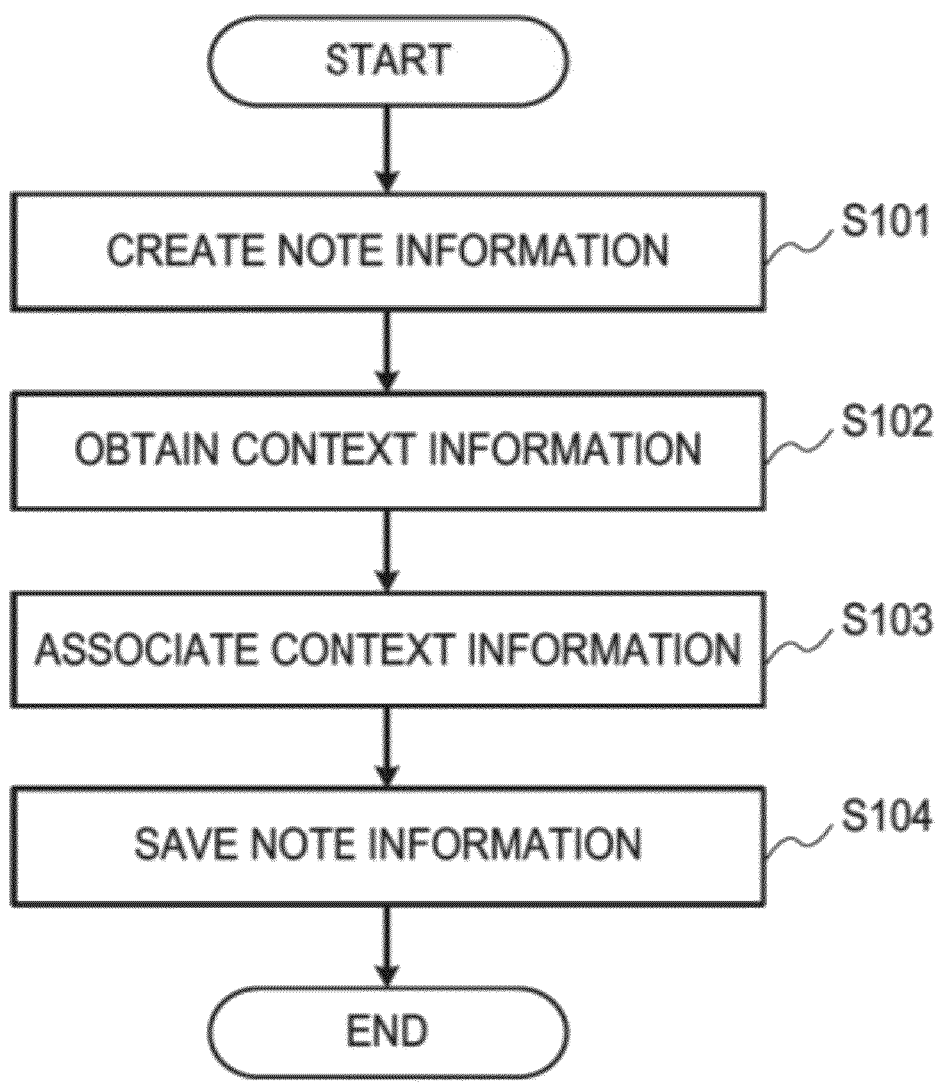
FIG. 3 is a flowchart of a registration operation process.
Figure 4:
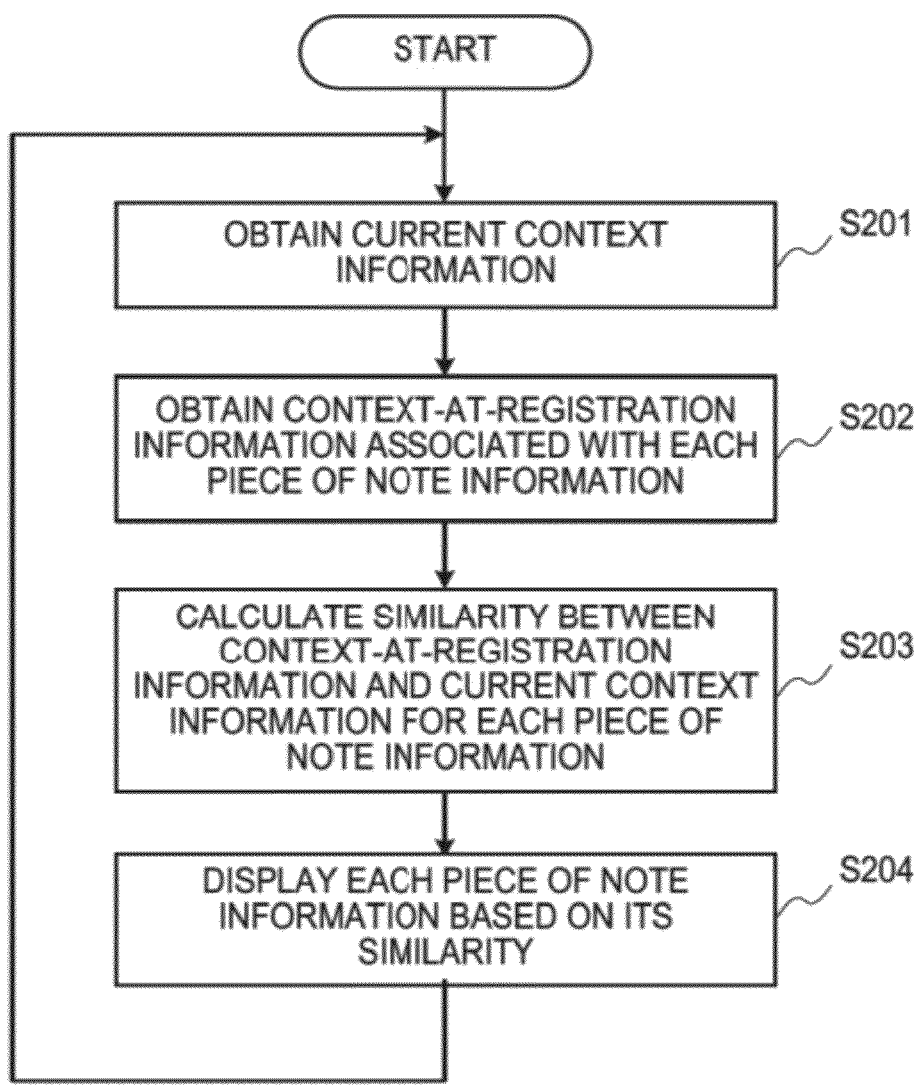
FIG. 4 is a flowchart of a display operation process.

FIG. 3 illustrates a procedure of processing for a registration operation process performed on the information display apparatus and FIG. 4 illustrates a procedure of processing for a display operation process performed on the information display apparatus.

First, the registration operation process is described. The registration operation process is started when the information processing apparatus has received a specific instruction indicating start of the process from the user. For example, when the MPU 101 has detected a certain operation performed by the user to the input device 105 which is associated with the instruction, the registration operation process is started.

In FIG. 3, first at S101, a note information creation process is performed by the note information creating part 1. The MPU 101 functioning as the note information creating part 1 provides the user with an interface for text entry (e.g., displays a Graphical User Interface (GUI) screen for text entry on the display device 106) so that the user may input note information as text. Then, text input through operations on a keyboard device serving as the input device 105, for example, is obtained as note information.

Here, the MPU 101 may obtain information on a link (information on association) between a file or a Web page shown on the display screen of the display device 106 and the note information obtained based on drag-and-drop operations on a mouse device which serves as the input device 105, for example.

Also at this point, the note information creating part 1 may obtain information indicating a display mode for displaying the obtained note information on the note information display part 5 (the display device 106) together. A display mode that may be indicated by information obtained here may be designation of a display area and/or color for use when the note information is displayed as an electronic sticky note on the desktop (e.g., a basic operation screen) displayed on the display device 106, for example.

Two examples of note information data created by the note information creating part 1 are illustrated in FIGS. 5A and 5B.

In a first example of note information data illustrated in FIG. 5A, text "note-1" input by the user is displayed as an electronic sticky note in an area defined by coordinates (10, 20)-(60,40), which represents a partial area on the desktop, in a background color of yellow.

A second example of note information data illustrated in FIG. 5B indicates a position on the desktop of an electronic sticky note for displaying text input by the user, "note-1", as coordinates (10, 20). The second example also indicates the size of the electronic sticky note with its width (50) and height (20), and further indicates background color with values of RGB colors as (R, G, B)=(255, 255, 0).

The following description will be provided assuming that the first example note information illustrated in FIG. 5A is created by the note information creating part 1.

Note information created as described above is sent from the note information creating part 1 to the context associating part 2. Upon receiving the note information, the context associating part 2 then performs a context information acquisition process at S102. The context information acquisition process is a process for the context associating part 2 to obtain context information by giving a specific instruction to the context extracting part 3 to have the context extracting part 3 send the context information it has extracted so far.

The context extracting part 3 monitors a context of a computer used by the user. In the present embodiment, the MPU 101 functioning as the context extracting part 3 always monitors the state (or context) of a window screen being opened on the desktop currently shown on the display device 106, and outputs context information indicative of the context as a result of extraction. Here, a window screen refers to a screen on which contents of a file or a Web page, which is being opened by the computer, is displayed.

Figure 6:
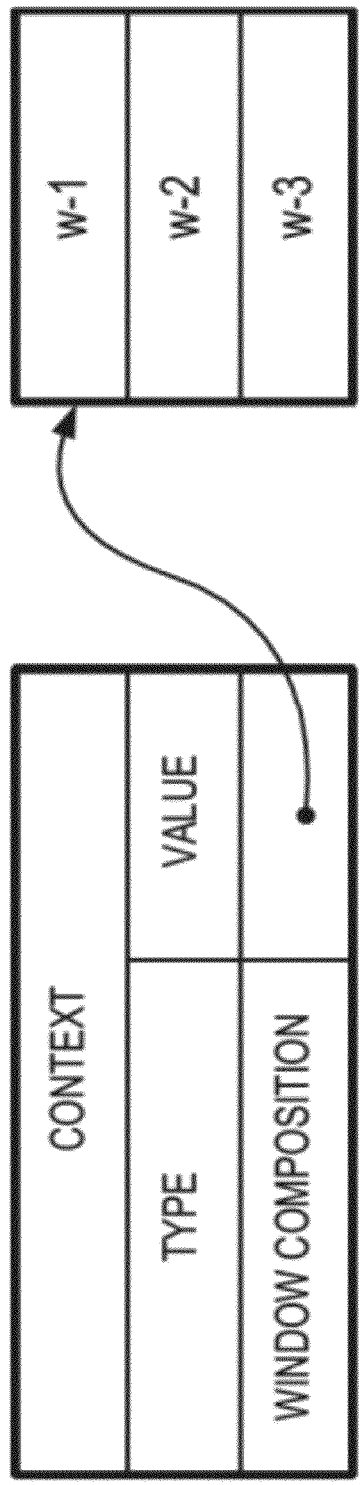
FIG. 6 illustrates example data of context information.

An example data of context information output by the context extracting part 3 is illustrated in FIG. 6. In FIG. 6, "type" item is set to "window composition", meaning that the context of the computer to be monitored is window screens. Also in the example of FIG. 6, a list consisting of "w-1", "w-2", and "w-3" is stored in context information as "value" item. This means that three window screens called "w-1", "w-2", and "w-3" are being opened on the desktop at this point in time. The value of the list may be information representing titles assigned to the window screens, for example. The value may also be information on a file path that identifies a storage position of a file in the hard disk device 104 or information on a Uniform Resource Locator (URL) that identifies a position on a communication network where a Web page is located, for example.

The MPU 101 functioning as the context associating part 2 performs processing for obtaining context information which is extracted and output by the context extracting part 3 as described above.

Figure 7:
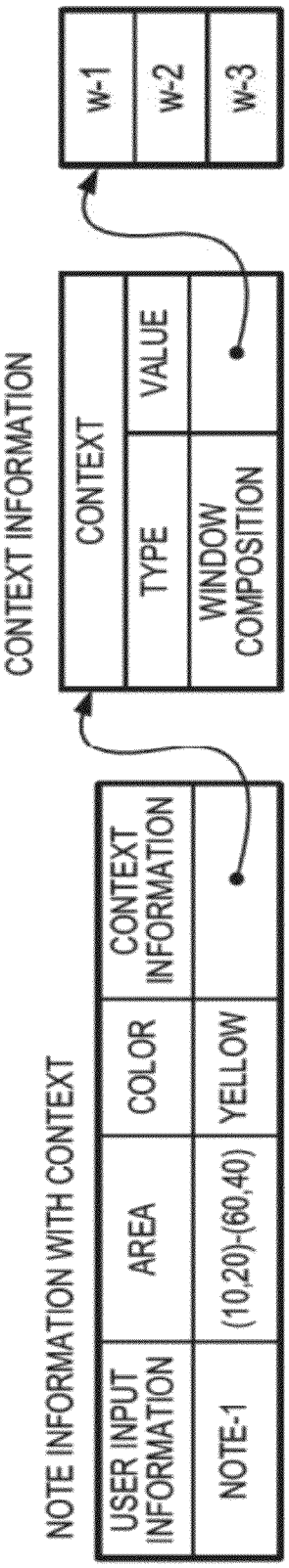
FIG. 7 illustrates example data of note information with context.

Then, at S103 of FIG. 3, a context association process is performed by the context associating part 2. In this process, the MPU 101 functioning as the context associating part 2 associates the note information received from the note information creating part 1 in the processing at S101 with the context information which has been obtained from the context extracting part 3 in the processing at S102. Then, the context associating part 2 adds the associated context information to the note information to generate note information with context, which is output as the result of association. An example data of note information with context which is generated by associating and adding the context information illustrated in FIG. 6 with and to the note information illustrated in FIG. 5A by the context associating part 2 is illustrated in FIG. 7.

The note information with context thus created is sent from the context associating part 2 to the information saving part 4. Upon receiving the note information with context, the information saving part 4 then performs a note information saving process at S104. In this process, the MPU 101 performs processing for storing and saving the note information with context in the hard disk device 104 which functions as the information saving part 4.

Figure 8:
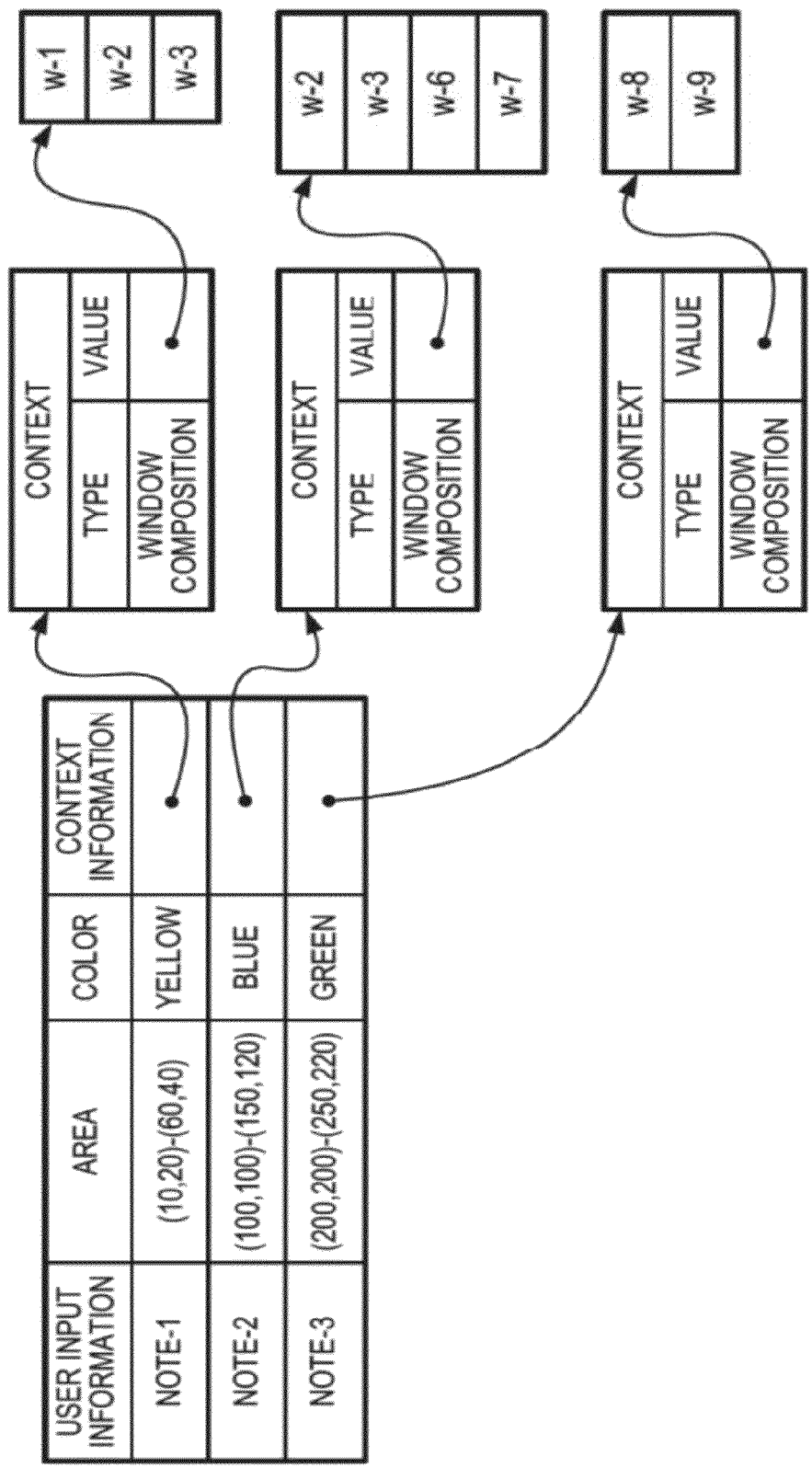
FIG. 8 illustrates an example of saving note information with context in an information saving part.

An example of a saving of note information with context in the information saving part 4 is illustrated in FIG. 8. In the example of FIG. 8, three pieces of note information with context, "note-1", "note-2", and "note-3", are saved in the information saving part 4.

When processing up to S104 is completed, the registration operation process of FIG. 3 ends.

Now, the display operation process of FIG. 4 is described. The display operation process is started when the information display apparatus is started up (e.g., upon completion of a specific initialization process which is performed by the MPU 101 when supply of electric power to the computer of FIG. 2 is started), and subsequently, processes from S201 to S204 of FIG. 4 are repeatedly executed.

In FIG. 4, first at S201, a current context information acquisition process is performed by the context similarity evaluating part 6. The MPU 101 functioning as the context similarity evaluating part 6 gives a specific instruction to the context extracting part 3 to have the context extracting part 3 send context information extracted by the context extracting part 3 as described above, and receives the context information. Hereinafter, context information obtained in this process will be called "current context information".

Next, at S202, a process to acquire note information with context is performed by the context similarity evaluating part 6. The MPU 101 functioning as the context similarity evaluating part 6 reads and obtains all note information with context saved in the information saving part 4. Hereinafter, context information obtained through this process will be called "context-at-registration information".

Then, at S203, a context similarity evaluation process is performed by the context similarity evaluating part 6. This process evaluates similarity among current context information, each piece of note information contained in note information with context obtained from the information saving part 4 in the process at S202, and context-at-registration information.

For evaluation of the similarity, the MPU 101 functioning as the context similarity evaluating part 6 performs processing for calculating context similarity S_i for note information i by performing the operation below.

First, assume that a window composition indicated by the current context information is: W={w_1, w_2, . . . , w_m}, and a window composition indicated by context-at-registration information saved in the information saving part 4 associated with note information i is: W_i={w_i1, w_i2, . . . , w_in}.

Here, assume that the number of elements in W_i is N_i, and the number of elements in the product set of W and W_i {w|w is an element both of W and W_i} is Ni_i. Here, the MPU 101 calculates the context similarity S_i for note information i by operation according to Equation 2 below:

$$S\_i = \frac{Ni\_i}{N\_i} \quad \text{[Equation 2]}$$

By way of example, consider a case where a window composition indicated by the current context information is W={w-1, w-2, w-3, w-4, w-5} and what is illustrated in the example of FIG. 8 is saved in the information saving part 4 as note information with context.

In this case, W_1 equals {w-1,w-2,w-3} in the example of FIG. 8 for note information 1 ("note-1"), hence N_1=3. Also, W equals {w-1,w-2,w-3,w-4,w-5} and all of the elements of W_1 are the elements of W, hence Ni_1=3. Therefore, context similarity S_1 of note information 1 is: S_1=Ni_1/N_1=3/3=1.0.

For note information 2 ("note-2"), W_2 equals {w-2,w-3, w-6,w-7} in the example of FIG. 8, hence N_2=4. Also, since W equals {w-1,w-2,w-3,w-4,w-5}, the product set of W and W_i is {w-2, w-3} and hence Ni_2=2. Therefore, context similarity S_2 of note information 2 is: S_2=Ni_2/N_2=2/4=0.5.

For note information 3 ("note-3"), W_3 equals {w-8,w-9} in the example of FIG. 8, hence N_3=2. However, since W equals {w-1,w-2,w-3,w-4,w-5}, the product set of W and W_i is an empty set and hence Ni_3=0. Therefore, context similarity S_3 for note information 3 is: S_3=Ni_3/N_3=0/2=0.

In the example above, note information 1 has the highest context similarity and note information 3 has the lowest context similarity. That is to say, note information for which more window screens are still opened on the current desktop out of window screens that were opened on the desktop when the note information was registered has a higher value of context similarity and is determined to have similar context between the time of registration and the present time.

The MPU 101 functioning as the context similarity evaluating part 6 calculates context similarity of all note information contained in each piece of note information with context obtained from the information saving part 4. The calculated context similarity is sent from the context similarity evaluating part 6 to the note information display part 5 along with the associated note information.

Upon receiving the note information and context similarity, the note information display part 5 performs a note information display process at S204. The note information display process is a process of displaying each piece of note information in a display mode according to its associated context similarity in addition to a display mode indicated by the note information itself.

Figure 9:
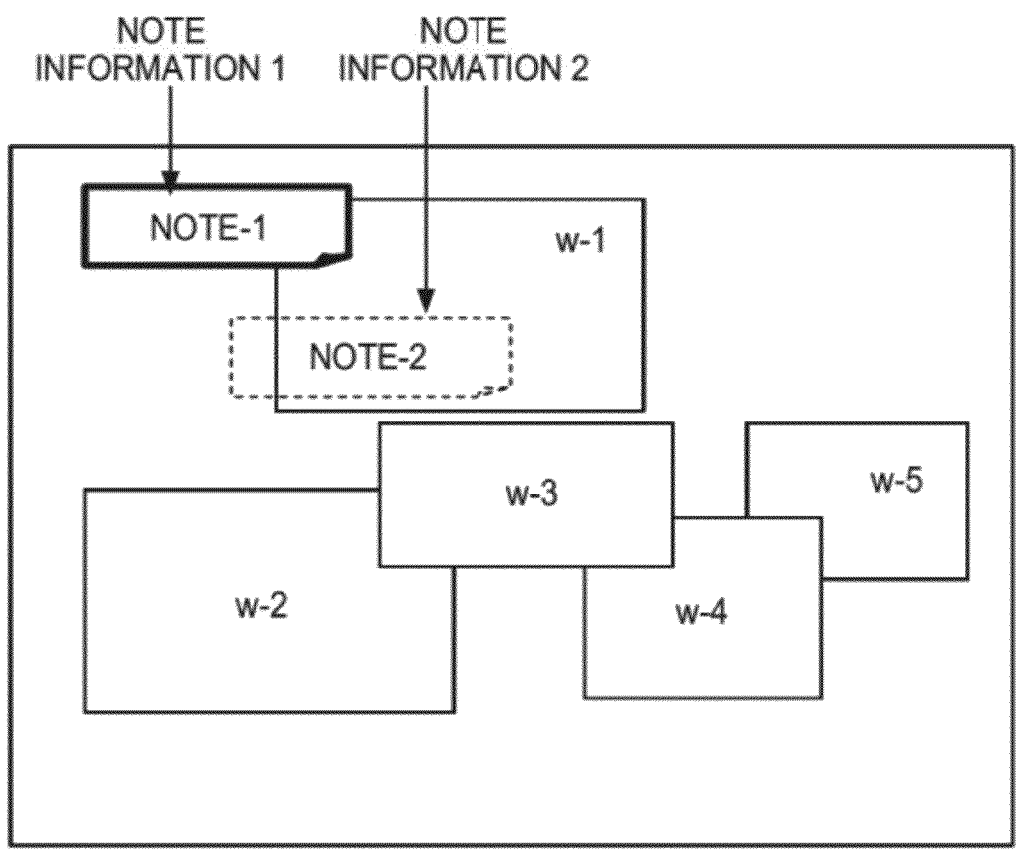
FIG. 9 illustrates a first example of a display mode for note information based on context similarity.

FIG. 9 illustrates a first example of a display mode for note information based on context similarity. FIG. 9 illustrates a case where electronic sticky notes showing note information are displayed with different levels of transparency depending on context similarity.

In the aforementioned example, note information 1, 2, and 3 have context similarity of 1.0, 0.5, and 0, respectively, as illustrated in FIG. 8. Accordingly, the example display of FIG. 9 displays an electronic sticky note for note information having lower context similarity with a higher level of transparency. Specifically, an electronic sticky note for note information 1 is displayed with a transparency level of 0% (i.e., opaque) so that "note-1" is displayed with high visibility. An electronic sticky note for note information 2 is displayed with a transparency level of 50% (translucent) so that "note-2" is displayed with lower visibility than "note-1". An electronic sticky note for note information 3 is displayed with a transparency level of 100%, i.e., being completely transparent. As a result, display of the electronic sticky note is not illustrated in FIG. 9.

In such a manner, an electronic sticky note for note information that has high context similarity, whose display of window screens on the desktop at the present time is similar to that at the time of registration, and that is considered to be desired at present is displayed with higher visibility. The user may therefore easily find necessary information from among a large number of electronic sticky notes.

When the processing at S204 described above is completed, the processing returns to S201 and subsequently processes from S201 to S204 of FIG. 4 are repeatedly executed.

The processing described so far is the display operation process. By this processing being performed on the information display apparatus of FIG. 1, note information saved in the information saving part 4 is displayed in a mode that reflects similarity of context information between the time when the note information was registered and the present time.

The present invention may be also implemented with modifications to the configuration and/or operation of the information display apparatus of FIG. 1 described thus far. Several examples of such modifications will be described below.

First, calculation of context similarity by the context similarity evaluating part 6 (S203 of FIG. 4) may also be performed as described below.

First, assume that a window composition indicated by the current context information is: W={w_1, w_2, . . . , w_m}, and a window composition indicated by context-at-registration information saved in the information saving part 4 being associated with note information i is: W_i={w_i1, w_i2, . . . , w_in}.

It is assumed here that the number of elements in the sum set of W and W_i {w|w is an element of at least one of W and W_i} is Nu_i and the number of elements in the product set of W and W_i {w|w is an element of both W and W_i} is Ni_i. Here, the MPU 101 functioning as the context similarity evaluating part 6 calculates context similarity S_i for note information i by operation of Equation 3 below:

$$S\_i = \frac{Ni\_i}{Nu\_i} \quad \text{[Equation 3]}$$

By way of example, consider a case where a window composition indicated by the current context information is W={w-1,w-2,w-3,w-4,w-5} and what is illustrated in the example of FIG. 8 is saved in the information saving part 4 as note information with context. In this case, context similarity S_1 for note information 1 is S_1=Ni_1/Nu_1=3/5=0.60, context similarity S_2 for note information 2 is S_2=Ni_2/Nu_2=2/70.29, and context similarity S_3 for note information 3 is S_3=Ni_3/Nu_3=0/7=0.

Also when context similarity is calculated in this way, the note information whose window screen composition on the desktop at the time of registration is closer to its current composition will have higher context similarity. In addition, by performing the calculation as described above, note information for which the number of window screens that were opened on the desktop at the time of registration is significantly smaller than that at the present time will have low context similarity. Likewise, context similarity will be low also for note information for which the number of window screens that are opened on the desktop at present is significantly greater than at the time of registration of the note information.

As a result, in the processing at S204 of FIG. 4, an electronic sticky note for note information which has higher context similarity and is considered to be more desired at present is displayed with higher visibility. Likewise, an electronic sticky note for note information that has lower context similarity and is considered to be less desired at present is displayed with lower visibility. This enables the user to easily find desired information from many electronic sticky notes.

It is also possible to weight window screens in accordance with degree of importance of their relevancy with note information when the context extracting part 3 outputs context-at-registration information that indicates context of window screens on the desktop at the time of note information registration (S102 of FIG. 3).

Figure 10:
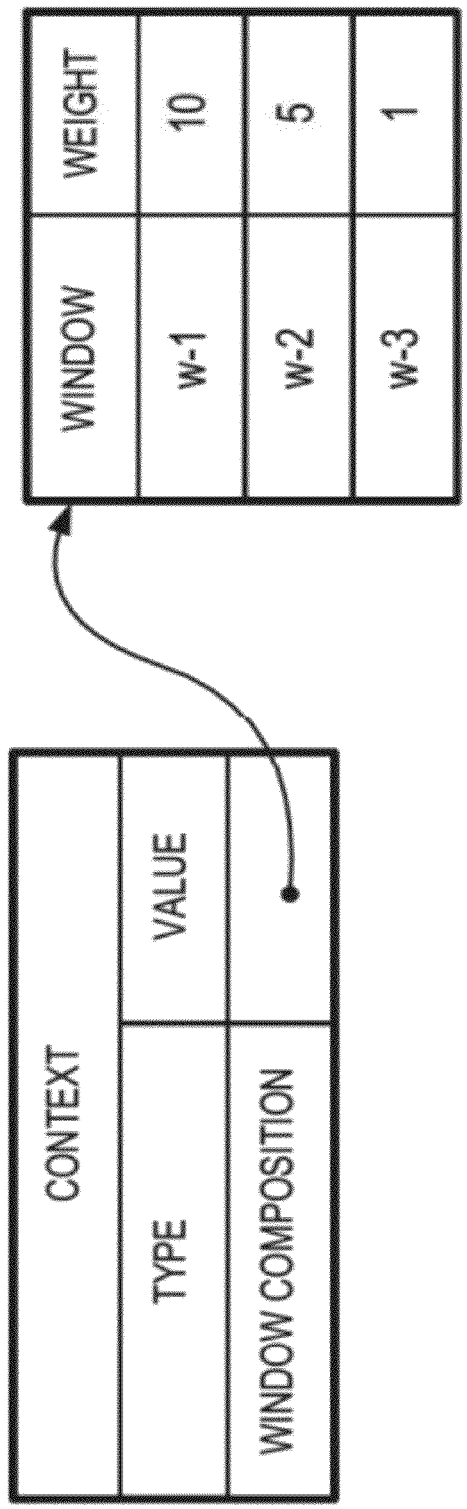
FIG. 10 illustrates example data of context information with window screens weighted.

An example data of context information with window screens weighted is illustrated in FIG. 10. The example of FIG. 10 is similar to the example illustrated in FIG. 6 in that the example in FIG. 10 indicates that the context of the computer to be monitored is window screens and three window screens called "w-1", "w-2", and "w-3" are being opened on the desktop. In addition, the example of FIG. 10 indicates that "w-1" is given a weight of "10", "w-2" is given a weight of "5", which is lighter than that of "w-1", and "w-3" is given a weight of "1", which is lighter than that of "w-2".

The weighted values may also be assigned in accordance with how much attention is being paid to window screens, for example.

A window screen which is active when note information is registered or a window screen that is appropriately displayed on the desktop (e.g., not displayed as a small icon) is paid attention by the user and is likely a window screen that is specific to the task the user is conducting at the time. Therefore, when such a window screen is displayed on the current desktop, the user is probably conducting the particular task. Accordingly, in this example, "10" may be given to a window screen when it is opened in active state, "5" when opened in non-active state, and "1" when opened in non-active state and in the form of an icon.

In a context association process performed by the context associating part 2 at S103 of FIG. 3, processing for creating note information with context by adding the context information illustrated in FIG. 10 to note information is performed.

When the context extracting part 3 outputs context information with window screens thus weighted, the context similarity evaluating part 6 calculates context similarity S_i for note information i by the operation of Equation 4 below:

$$S\_i = \frac{\sum_{w \in W\_i}^{W\_i} f(w, W)}{N\_i} \quad \text{[Equation 4]}$$

In Equation 4, "f(w, W)" is a function that returns a weighted value for window screen w which is indicated by context-at-registration information. When window screen w is not included in the current context information W, however, the function returns a value of 0. "N_i" represents the number of elements in window composition W_i={w_i1, w_i2, ..., w_in} which is indicated by context-at-registration information saved in the information saving part 4 being associated with note information i. The MPU 101 functioning as the context similarity evaluating part 6 performs the above operation at S203 of FIG. 4 to calculate context similarity S_i for note information i.

The context similarity evaluating part 6 may also calculate context similarity S_i for note information i by the operation of Equation 5 below if the context extracting part 3 outputs context information with window screens weighted.

$$S\_i = \frac{\sum_{w \in W\_i}^{W\_i} f(w, W)}{Nu\_i} \quad \text{[Equation 5]}$$

In Equation 5, "f(w, W)" is the same as the aforementioned function. "Nu_i" is the number of elements in the sum set of a window composition indicated by the current context information, W={w_1, w_2, ..., w_m}, and a window composition indicated by context-at-registration information, W_i={w_i1, w_i2, ..., w_in}. The MPU 101 functioning as the context similarity evaluating part 6 performs the above operation at S203 of FIG. 4 to calculate context similarity S_i for note information i.

Thus, by assigning a weight corresponding to an activity state and/or a display size of a window screen, which can be considered to indicate the degree of the user's attention, note information required by the user may be identified more correctly. Therefore, in the processing at S204 of FIG. 4, an electronic sticky note displaying such note information may be displayed with high visibility.

The note information display part 5 may also normalize context similarity S_i determined in one of the aforementioned methods by the context similarity evaluating part 6, according to Equation 6 below when displaying note information (S204 of FIG. 4):

$$S'\_i = \frac{S\_i}{\max(S\_1, S\_2, \ldots, S\_n)} \quad \text{[Equation 6]}$$

Here, "max (S_1, ..., S_n)" is a function that returns the maximum value in context similarity S_i (i=1, ..., n) for note information i. The note information display part 5 may also display note information in a display mode based on context similarity S'_i normalized in such a way.

This may convert a range which context similarity may assume to between 0 and 1 through normalization even when the range is inconstant, appropriateness of display may be maintained more easily when note information is displayed in a display mode that reflects its context similarity.

Alternatively, for each window screen, the information saving part 4 may count the number of pieces of note information with context at registration for which the window screen is contained in context information out of all pieces of note information with context at registration saved in the information saving part 4. Hereinafter, the number resulting from this counting will be called "the number of links" for a window screen of interest.

The MPU 101 counts the number of links for each window screen when saving note information with context (S104 of FIG. 3). An example data of link count information thus obtained that indicates the number of links for individual windows screen is illustrated in FIG. 11.

Figure 11:
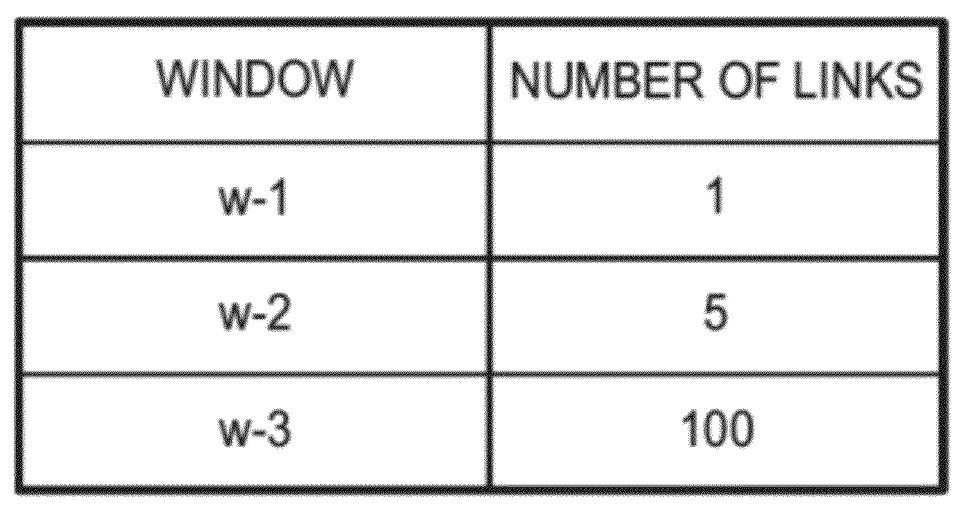

The example of FIG. 11 indicates that window screen "w-1" is contained only in context information of only one piece of note information with context-at-registration, window screen "w-2" is contained in context information of five pieces of note information with context-at-registration, and window screen "w-3" is contained in context information of as many as one hundred pieces of note information with context-at-registration.

The information saving part 4 saves the number of links information. If the information saving part 4 saves the number of links information, the context similarity evaluating part 6 also reads out and obtains the number of links information when reading and obtaining note information with context-at-registration (S202 of FIG. 4). It is assumed that in this case the context similarity evaluating part 6 uses function f(w,W) as defined by Equation 7 below when determining context similarity S_i for note information i by the operation of Equation 4 or Equation 5 described above:

$$f(w, W) = \begin{cases} w \in W : m/l \\ w \notin W : 0 \end{cases} \quad \text{[Equation 7]}$$

In the Equation 7, "m" represents a weighted value for window screen w indicated in context-at-registration information, and "l" represents the number of links for window screen w. In other words, function "f(w,W)" is a function that returns a value obtained by dividing the weighted value for window screen w indicated in context-at-registration information by the number of links l for that window screen w. However, when window screen w is not contained in the current context information W, the function returns a value of zero.

By thus making a weight smaller for a window screen having a larger number of links, it is possible to identify note information required by the user with higher accuracy. This is because such a window screen that has always been present at the time of registration of many pieces of note information is not characteristic to the state of desktop at the time of registration of the note information. It is probable that such a window screen has a large number of links. Therefore, by defining the function f(w, W) as described above, it is possible to reduce the effect of such a window screen that is considered to be less important on context similarity.

The context extracting part 3 may also obtain context information indicating the state of a window screen (e.g., context) at certain time intervals from when note information was registered to the present time, and output the obtained sequence of information to the context similarity evaluating part 6 as history information.

Figure 12:
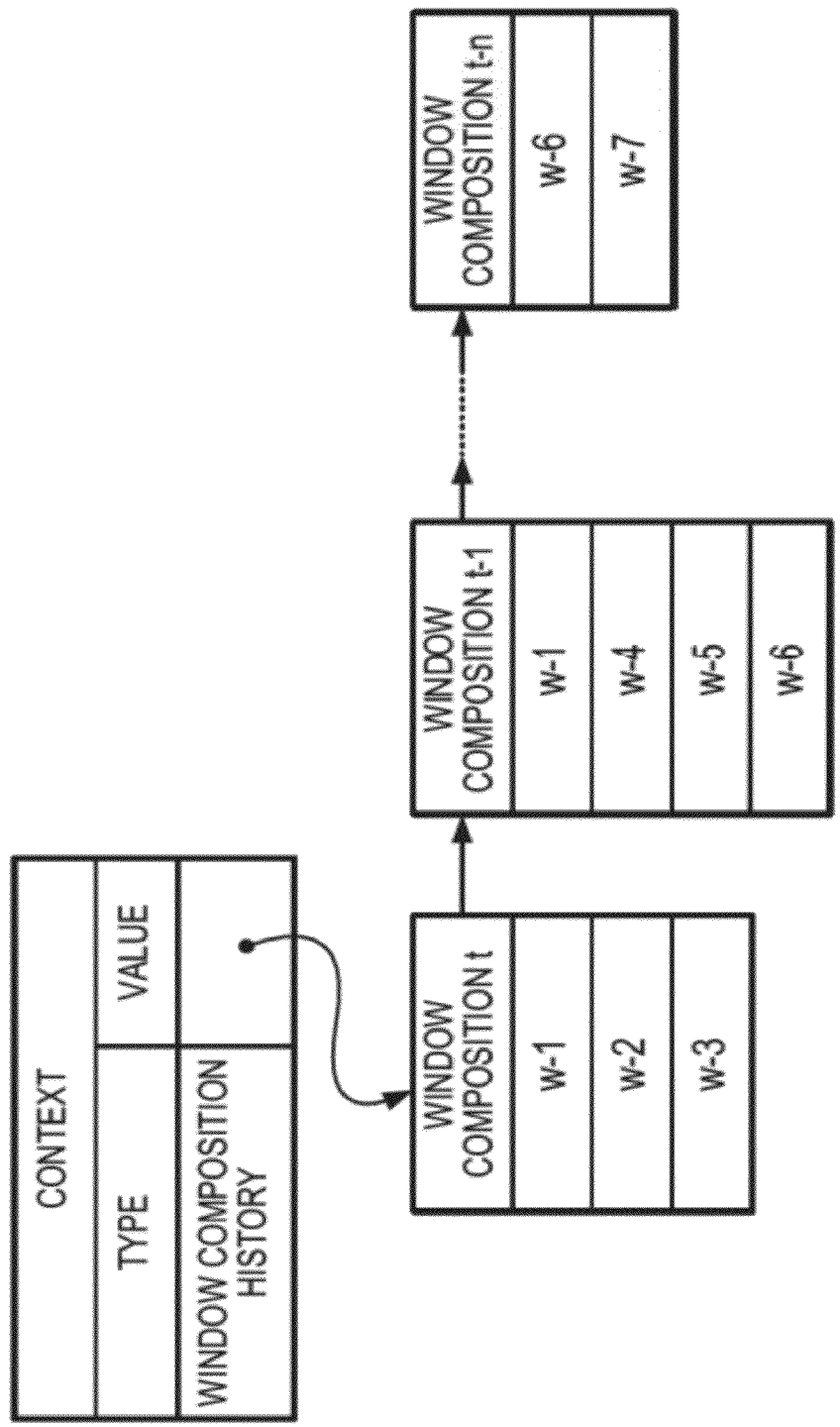
FIG. 12 illustrates example data of context history information.

FIG. 12 illustrates example data of context history information obtained by the context extracting part 3. The example of FIG. 12 indicates that three window screens, "w-1", "w-2", and "w-3", are opened on the desktop as the window screen composition at the present time t, which is current context information. The example of FIG. 12 also indicates that four window screens, "w-1", "w-4", "w-5" and "w-6", were being opened on the desktop as history of window screen composition at time t-1, i.e., a certain time before the current time t. The example of FIG. 12 further indicates that two window screens, "w-6" and "w-4", were being opened on the desktop as history of window screen composition at time t-n, i.e., n times the certain time before the current time t.

The context similarity evaluating part 6 performs processing for obtaining context history information such as illustrated in FIG. 12 from the context extracting part 3 when obtaining current context information (S201 of FIG. 4). In this case, the context similarity evaluating part 6 calculates context similarity (S203 of FIG. 4) according to Equation 8 below:

$$S\_i = \sum_{t} At \cdot St\_i \quad \text{[Equation 8]}$$

In Equation 8, St_i represents context similarity of window composition at a certain point in time t, calculated using one of Equation 2 through Equation 7 described above. A(t) is a function that returns a weighted value which is set based on the date and time of a certain point in time, t. For example, weight A(t) to be multiplied to context similarity of a window composition having an older date and time (i.e., a smaller value of t) will be set to a smaller value. In other words, A(t) is a function that monotonically increases with respect to increase in t.

By thus determining context similarity based on the history of window screen composition, context similarity reflecting the procedure of the user's work or the like may be obtained and hence note information required by the user may be identified with higher accuracy. Therefore, in the processing at S204 of FIG. 4, an electronic sticky note that displays such note information may be displayed with high visibility.

The context extracting part 3 may also output other context indicating the state of the computer used by the user as context-at-registration information when outputting context-at-registration information (S102 of FIG. 3).

Figure 13:
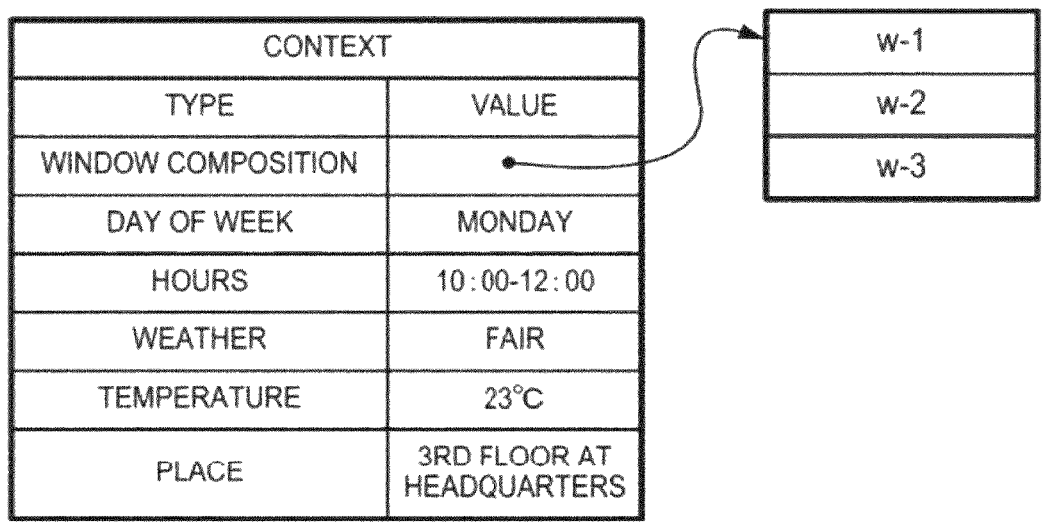
FIG. 13 illustrates example data of context-at-registration information including context indicative of various states of a computer.

FIG. 13 illustrates an example data of context-at-registration information output from the context extracting part 3 that includes context indicating various states of the computer.

In the example of FIG. 13, in the first place, "type" item is "window composition", and a list including "w-1", "w-2" and "w-3" is stored in context information as a "value" item. This indicates that three window screens, "w-1", "w-2" and "w-3", are being opened on the desktop as in the example illustrated in FIG. 6.

In the example of FIG. 13, "type" items further include "day of the week", "hour", "weather", "temperature", and "place". And as "value" items associated with the items, values of "Monday", "10:00-12:00", "fair", "23° C.", and "third floor at headquarters" are stored. These values respectively mean that the note information was registered on "Monday" in the hours of "10:00-12:00", the weather at the time of the registration was "fair" and the temperature was "23° C.", and the user who made the registration was at the "third floor at headquarters".

Here, date, day of the week, and/or time at the time of registration of note information are obtained from clock and calendar functions of the computer which functions as the information display apparatus of FIG. 1, for example. Meteorological information may be obtained by the computer accessing a specific meteorological service over a communication network, for example. The user's location may be obtained by utilizing the Global Positioning System (GPS) or based on information about the location where an access point utilized for connecting the computer to a communication network is installed, for example.

When the context extracting part 3 outputs such context-at-registration information as described above, the context similarity evaluating part 6 obtains the context-at-registration information in processing at S202 of FIG. 4. Also in this case, the context extracting part 3 outputs the same context as the one included in the context-at-registration information as current context information when outputting current context information (S201 of FIG. 4). And the context similarity evaluating part 6 obtains the context together when it obtains the current context information (S201 of FIG. 4). Then, when calculating context similarity S_i for note information i (S203 of FIG. 4), the context similarity evaluating part 6 calculates the context similarity S_i according to Equation 9 below:

$$S\_i = \sum_j fj(c, C) \quad \text{[Equation 9]}$$

In Equation 9, "fj(c,C)" is a function that determines context similarity from value c for context item j in context-at-registration information and value C for corresponding context item j in the current context information, for note information i. A context item is an item that is shown in "type" field in the example of FIG. 13.

For context item "window composition", context similarity is calculated using any one of the aforementioned methods. For other context items, a table that associates combinations of values in context-at-registration information and values in the current context information with context similarities in advance is prepared and context similarity is determined by making reference to the table, for example. Context similarity may also be determined by defining a function that defines correspondence relation in the table and executing the operation of the function.

By thus including also information on matters other than window screen composition on the desktop into context information, it is possible to obtain context similarity that reflects the state of the computer functioning as the information display apparatus in greater detail. As a result, note information required by the user may be identified more accurately, and hence an electronic sticky note that shows such note information may be displayed with high visibility in the processing at S204 of FIG. 4.

Also, the context associating part 2 may get selection of a state (or context) of the computer which is selected by the user for association with note information at the time of association of note information with context information (S103 of FIG. 3). That is to say, the MPU 101 functioning as the context associating part 2 performs processing for obtaining an indication of the result of selecting a window screen that the user wants to associate with note information, which is made through operation of a mouse device as the input device 105, for example. Then, the context associating part 2 creates and outputs note information with context that associates only window screens relevant to the obtained result of selection with note information received from the note information creating part 1.

By having the user designate association of note information with context when context in which note information will be desired by the user is obvious, note information required by the user may be more accurately identified. Therefore, an electronic sticky note that displays such note information may be displayed with high visibility in processing at S204 of FIG. 4.

The note information display part 5 may also display an electronic sticky note in a size depending on context similarity when displaying note information as an electronic sticky note in a display mode based on context similarity (S204 of FIG. 4). More specifically, the electronic sticky note may be displayed in a size that is calculated by multiplying context similarity after being normalized according to Equation 6 indicated above by a display size which is set at the time of registration, for example.

Figure 14:
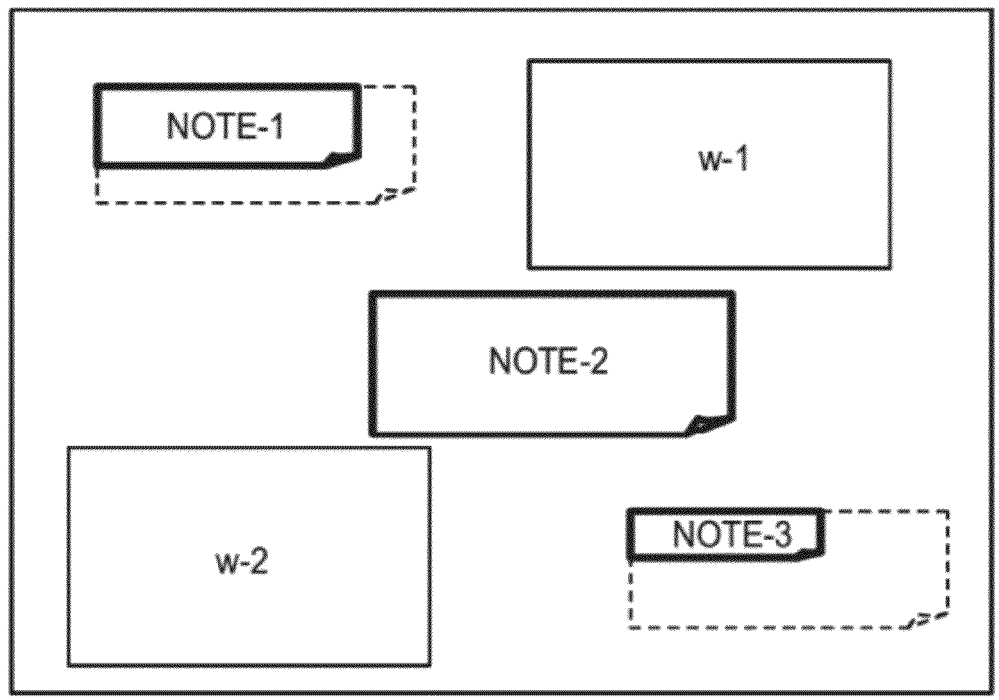
FIG. 14 illustrates a second example of display mode for note information based on context similarity.

A second example of display mode for note information that is based on context similarity is illustrated in FIG. 14. In the example of FIG. 14, "note-2" is displayed in a size that was set at the time of its registration because its context similarity S_2=1. On the other hand, "note-1" is displayed in a smaller size (0.75 times) than the size set at its registration because its context similarity S_1=0.75. Furthermore, because of its context similarity S_3=0.2, "note-3" is displayed being significantly reduced (0.2 times) with respect to the size set at the time of its registration. The broken lines in the FIG. 14 are drawn for indicating that the "note-1" and "note-3" are displayed while being reduced in size and are not displayed on an actual display screen.

By thus displaying electronic sticky notes in sizes that depend on their context similarity, an electronic sticky note for note information required by the user may be displayed with high visibility.

The note information display part 5 of FIG. 1 may also not display any note information whose context similarity is below a certain threshold value and display only note information whose context similarity is greater than or equal to the certain threshold value.

Figure 15:
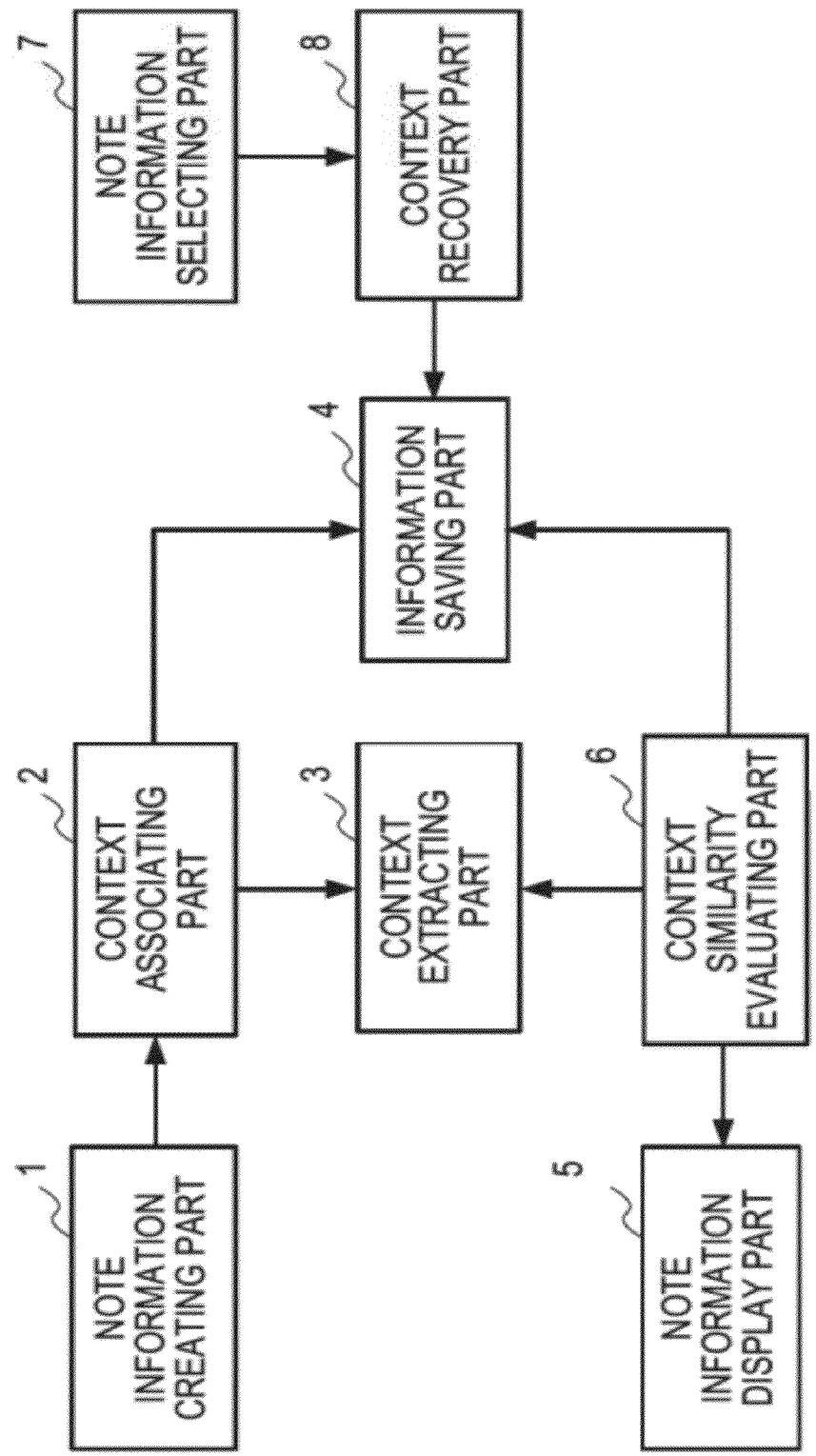
FIG. 15 illustrates a second example of the configuration of an information display apparatus to implement the present invention.

FIG. 15 will be now described. FIG. 15 illustrates a second example of configuration of an information display apparatus to implement the present invention. The second example adds a note information selecting part 7 and a context recovery part 8 to the first example configuration illustrated in FIG. 1.

The note information selecting part 7 obtains instructions from the user for selecting one of the pieces of note information being displayed by the note information display part 5.

The context recovery part 8 returns the information display apparatus to a state (e.g., context) indicated by context information associated with note information that relates to a result of selection obtained by the note information selecting part 7.

The information display apparatus illustrated in FIG. 15 may also be constructed using a computer having a standard hardware configuration such as illustrated in FIG. 2. For such construction, a control program is created first with which the aforementioned components of an information processing apparatus cause the MPU 101 to perform processes involved in a context recovery process discussed later in a procedure described below. The created control program is prestored in the hard disk device 104 or the portable recording medium 110. Then, a specific instruction is given to the MPU 101 to read and execute the control program. In this way, the computer of FIG. 2 functions as an information display apparatus.

The information processing apparatus illustrated in FIG. 15 also may perform note information registration and display operations similar to those illustrated in FIG. 1 by performing registration and display operation processes illustrated in FIGS. 3 and 4, respectively, and may be implemented with the various modifications described above.

Figure 16:
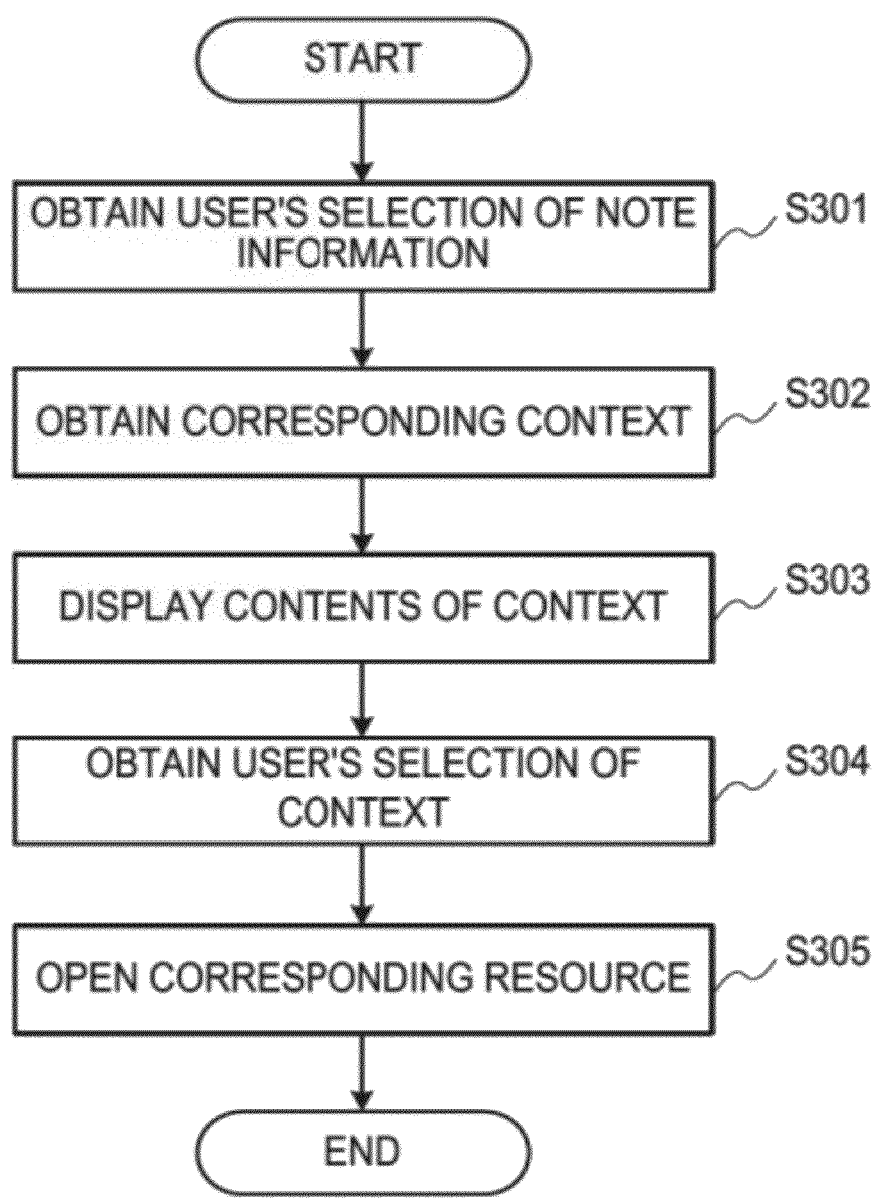
FIG. 16 is a flowchart of a context recovery process.

The flowchart illustrated in FIG. 16 will be now described. FIG. 16 illustrates processing for a context recovery process that is performed in the information display apparatus illustrated in FIG. 15.

This context recovery process is initiated upon startup of the information display apparatus (e.g., upon completion of a certain initialization process which is carried out by the MPU 101 when supply of electric power to the computer of FIG. 2 is started).

First, at S301, a note information selection process is performed by the note information selecting part 7. In this process, the MPU 101 functioning as the note information selecting part 7 obtains an indication of the result of selecting note information which is performed by the user by operating a mouse device as the input device 105, for example.

Figure 17A:
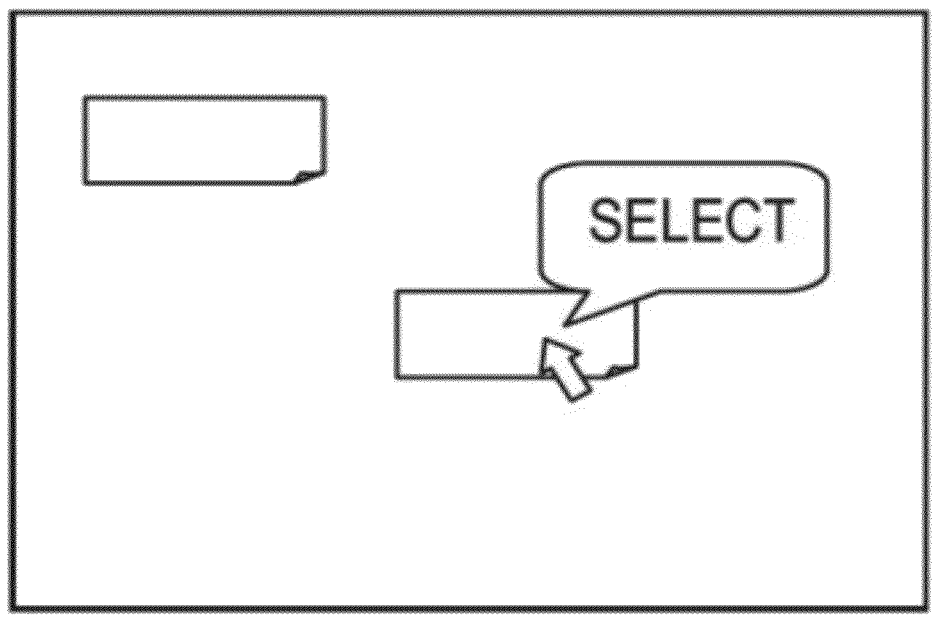
FIG. 17A illustrates note information selecting operations.

Operations for selecting note information are described with reference to FIG. 17A. On the display screen of the display device 106, electronic sticky notes indicating note information are being displayed by the note information display part 5. Here, the user operates a mouse device, for example, to move a cursor (an arrow in the figure) displayed on the display screen so that the cursor points to an electronic sticky note showing note information which the user wants to select. When the user performs a certain operation (e.g., a click on the mouse device), the MPU 101 obtains note information shown on the electronic sticky note which is being pointed to by the cursor at that time as an indication of the result of note information selection.

The indication of result of note information selection thus obtained is sent from the note information selecting part 7 to the context recovery part 8. Upon receiving an indication of note information selection, the context associating part 2 then performs a context information acquisition process at S302. This process is for the MPU 101 functioning as the context recovery part 8 to obtain, from note information with context saved in the information saving part 4, context-at-registration information associated with note information relevant to the indication of selection.

Then, at S303, a context display process is performed by the context recovery part 8. In this process, MPU 101 functioning as the context recovery part 8 causes the display device 106 to show contents of the obtained context-at-registration information.

The contents of the context-at-registration information may be displayed by showing titles of window screens indicated in the context-at-registration information as a list, for example. The contents may also be information on a file path that identifies a position in the hard disk device 104 where a file displayed in a window screen indicated in the context-at-registration information is stored. Furthermore, the contents may also be information on a URL that identifies a location on a communication network where a Web page displayed in the window screen is located.

Figure 17B:
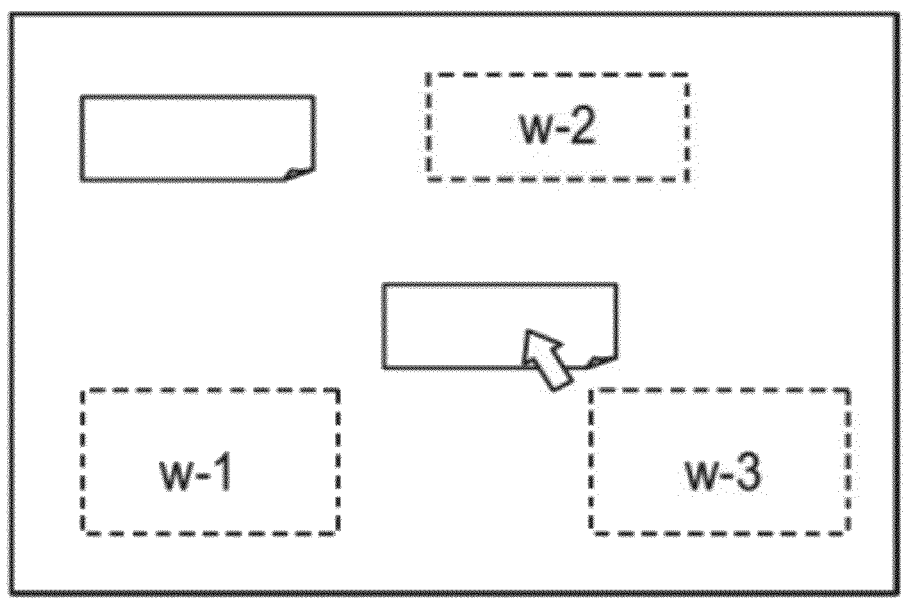
FIG. 17B illustrates an example of a screen on which context at the time of note information registration has been recovered.
Figure 18:
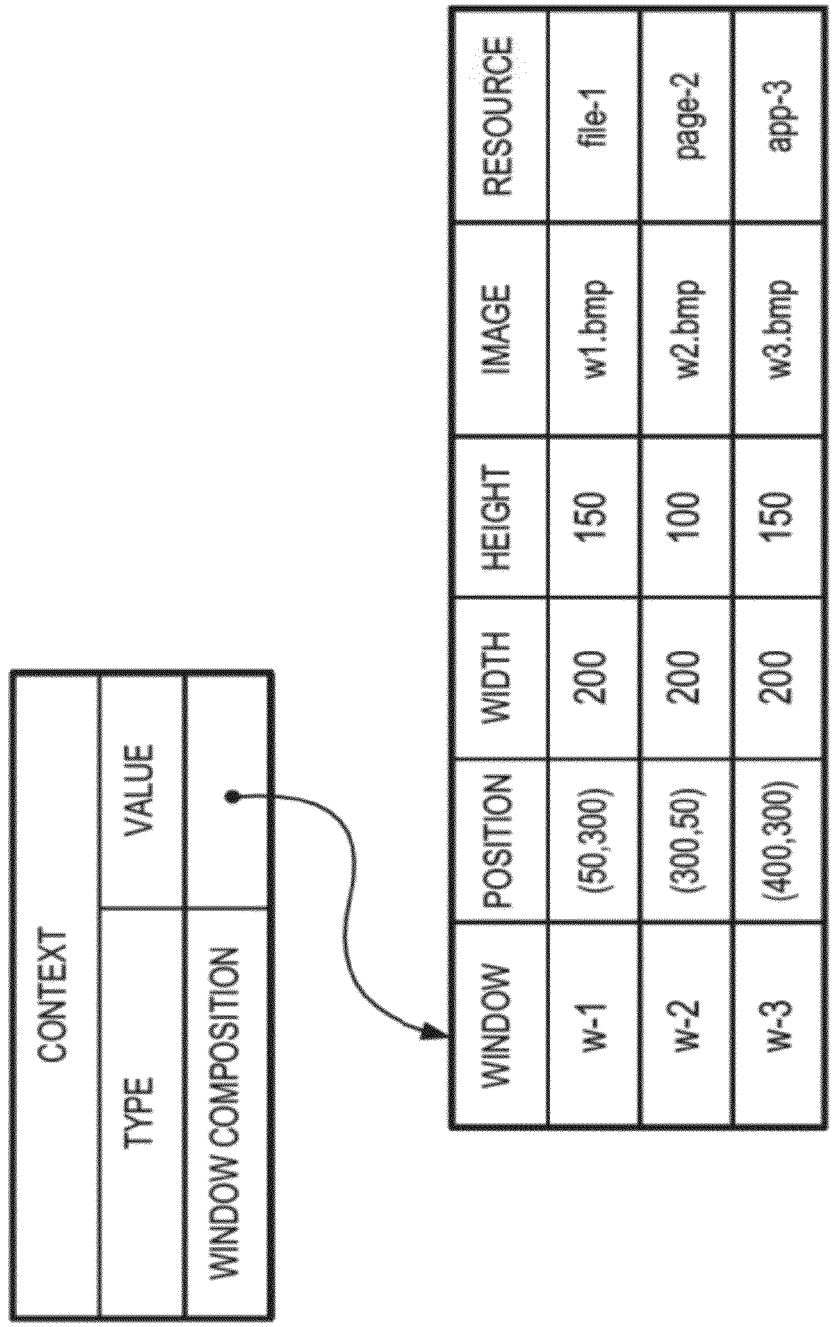
FIG. 18 illustrates example data of context-at-registration information for recovery of context.

Also, when the context extracting part 3 extracts context-at-registration information (S102 of FIG. 3), positions and/or areas of window screens that are being opened at that time, images being displayed, resources being opened or the like may be saved as window screen composition information. An example of data of context-at-registration information in that case is illustrated in FIG. 18. In this case, in the context display process at S303, the context recovery part 8 performs processing for drawing window screen images as at the time of note information registration to recover context in accordance with the window screen composition information. FIG. 17B illustrates an example of a screen on which context at the time of note information registration is thus recovered.

In FIG. 17B, "w-1", "w-2", and "w-3" represent images that were being displayed when note information was registered. Here, the images, "w-1", "w-2", and "w-3", are saved in a certain storage area of the hard disk device 104 as image files having file names "W1.bmp", "W2.bmp" and "W3.bmp", respectively. Also, the context-at-registration information of FIG. 18 illustrates correspondence relation between these window screens and the image files.

Subsequently, at S304 of FIG. 16, a context selection process is performed by the context recovery part 8. In this process, the MPU 101 functioning as the context recovery part 8 obtains an indication of a result of context selection which is performed by the user by operating a mouse device as the input device 105, for example.

Context selecting operations are described with reference to FIG. 17C.

On the display screen of the display device 106, a screen on which context at the time of note information registration has been recovered is displayed as illustrated in FIG. 17B. Here, the user may operate the mouse device, for example, to move a cursor being displayed on the display screen so that the cursor points to a context (or a window screen image) the user wants to select. When the user performs a certain operation (e.g., a click on the mouse device), the MPU 101 obtains a window screen image that is being pointed to by the cursor at the time ("w-2" in FIG. 17C) as an indication of result of context selection.

Then, at S305, a resource opening process is performed by the context recovery part 8. In this process, the MPU 101 functioning as the context recovery part 8 actually opens resources of the selected context (e.g., a file, Web page, applications) and displays them as window screens.

The resource opening process is described with reference to FIG. 17D.

Figure 17C:
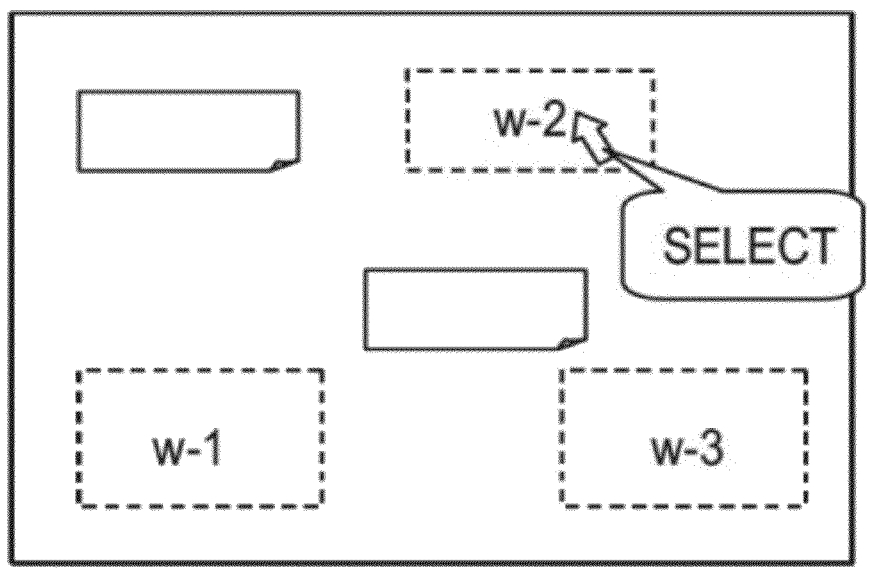
FIG. 17C illustrates context selecting operations.
Figure 17D:
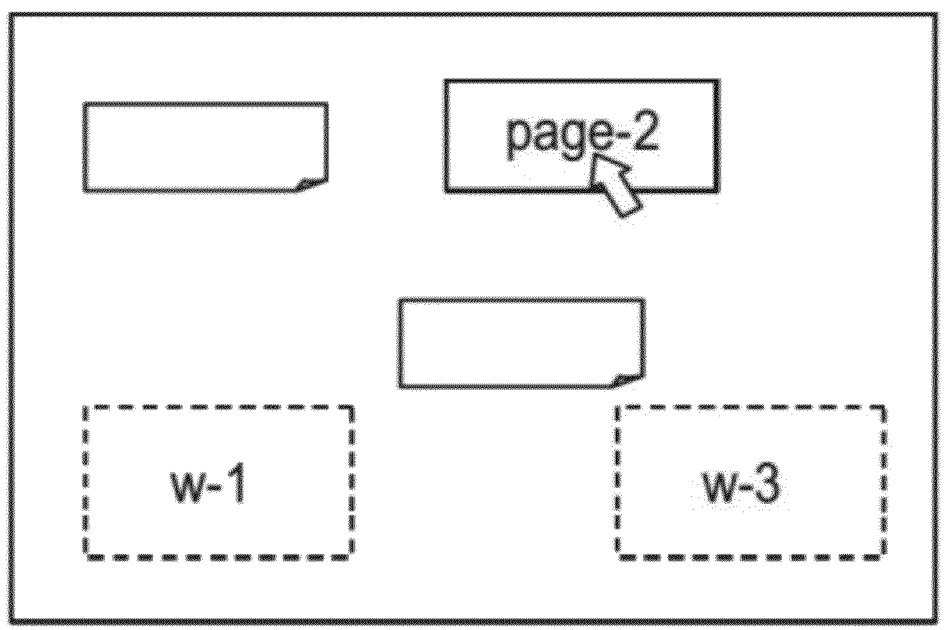
FIG. 17D illustrates a resource opening operation.

When a window screen image "w-2" is selected as illustrated in FIG. 17C, the MPU 101 makes reference to the context-at-registration information illustrated in FIG. 18 and extracts resource "page-2" which is associated with "w-2" from the information. Then, the MPU 101 actually opens the page-2 and displays a window screen for the page-2 at a position where image "w-2" was displayed.

When the process at S305 is completed, the context recovery process ends. At this point, processing may be returned to S301 and processes from S301 to S305 of FIG. 16 may be repeatedly executed.

By thus configuring the information display apparatus to additionally include the note information selecting part 7 and the context recovery part 8, not only necessary information may be provided to the user, but necessary resources, such as a file and a Web page, may be presented to the user. This may assist the user's memory and also improve convenience of access to information.

While the embodiments of the present invention has been described above, the present invention is not limited to the above-described embodiments and various improvements and modifications are possible without departing from the spirit of the invention.

The present invention provides an effect of enabling the user to easily find necessary information even when many pieces of information are concurrently displayed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

The invention claimed is:

1. A method for displaying various types of information, the method comprising:
   monitoring a state of a computer having a display device for displaying the information and extracting context information indicative of the state, the context information including window composition information which is information that identifies a window screen contained in a screen being displayed on the display device;
   saving one or more note information associated with a context information extracted at a time of registration of the note information for display, in a storage device;
   determining for each piece of the one or more saved note information, similarity between the extracted context information extracted at a certain point in time and the context information extracted at the time of registration which is associated with the one or more note information saved in the storage device; and
   displaying, by the display device, the one or more saved note information saved in the storage device in a display mode in accordance with the determined similarity of,
   wherein the context information extracted at the time of registration includes giving a weighted value to respective window screens included in a screen that is being displayed on the display device at the time of registration of the note information, the weighted value based on the display mode of the window screen, and extracting the window composition information including the weighted values for the respective window screens as context information,
   wherein saving the one or more note information includes saving the one or more note information in association with the extracted window composition information including the weighted values, and
   wherein determining the similarity between the context information extracted at the of registration and the extracted context information extracted at the certain point in time includes evaluating the similarity of the weighted values.

2. A non-transitory computer readable storage medium storing a program for displaying various types of information, when executed by a processor the program causing a computer to perform:
   monitoring a state of the computer and extracting context information indicative of the state, the context information including window composition information which is information that identifies a window screen contained in a screen being displayed on a display device of the computer;
   saving one or more note information associated with the context information extracted at a time of registration of the one or more note information for display, in a storage part of the computer;
   determining, for each piece of the one or more saved note information, similarity between the extracted context information at a certain point in time and the context information extracted at the time of registration which is associated with the note information saved in the storage part; and
   displaying the one or more note information saved in the storage part in a display mode in accordance with the determined similarity, on the display device of the computer,
   wherein the context information extracted at the time of registration includes giving a weighted value to respective window screens included in a screen that is being displayed on the display device at the time of registration of the one or more note information, the weighted value based on the display mode of the window screen, and extracting the window composition information including the weighted values for the respective window screens as context information,
   wherein saving the one or more note information includes saving the one or more note information in association with the extracted window composition information including the weighted values, and
   wherein determining the similarity between the context information extracted at the time of registration and the extracted context information at the certain point in time includes evaluating the similarity of the weighted values.

3. An apparatus which displays various types of information, the apparatus comprising:
   a processor configured to perform the functions of
      monitoring a state of the apparatus and extracting context information indicative of the state, the context information including window composition information which is information that identifies a window screen contained in a screen being displayed on the apparatus;
      saving one or more note information in association with a context information extracted at registration when the note information for displaying is registered;
      determining, for each piece of the one or more saved note information, similarity between the extracted context information extracted at a certain point in time and the context information extracted at registration which is associated with the one or more saved note information; and
   a display device for displaying the one or more saved note information in a display mode in accordance with the determined similarity,
   wherein the context information extracted at registration includes giving a weighted value to respective window screens included in a screen that is being displayed on the apparatus at the time of registration of the note information, the weighted value based on the display mode of the window screen, and extracting the window composition information including the weighted values for the respective window screens as context information,
   wherein saving the one or more note information includes saving the one or more note information in association with the extracted window composition information including the weighted values, and wherein determining the similarity between the context information extracted at registration and the extracted context information extracted at the certain point in time includes evaluating the similarity of the weighted values.

4. The apparatus according to claim 3, wherein the processor is configured to perform the further functions of
creating the one or more note information in accordance with input information;
and generating one or more note information with context by associating the created one or more note information with extracted context information when the one or more note information is created.

5. The apparatus according to claim 1,
wherein a set of window screens that are indicated in the window composition information extracted at the certain point in time is defined as W, and a set of window screens that are indicated in the window composition information associated with note information i, which is included in the one or more saved note information, is defined as W_i, and a function is defined as f(w,W) that, if element w in the set W_i is included in the set W, returns a weighted value given to the element w, and that returns a value of 0 if the element w is not included in the set W, and
wherein the determining the similarity between the context information extracted at registration and the extracted context information at the certain point in time includes calculating similarity S_i which represents the similarity of the one or more note information i from the number of elements N_i in the set W according to:

$$S\_i = \frac{\sum_{w \in W\_i}^{W\_i} f(w, W)}{N\_i}.$$

6. The apparatus according to claim 1,
wherein a set of window screens that are indicated in the window composition information extracted at the certain point in time is defined as W, and a set of window screens that are indicated in the window composition information associated with the one or more note information i, which is included in the one or more saved note information, is defined as W_i, and a function is defined as f(w,W) that, if element w in the set W_i is included in the set W, returns a weighted value given to the element w, and that returns a value of 0 if the element w is not included in the set W, and
wherein the determining the similarity between the context information extracted at registration and the extracted context information at the certain point in time includes calculating similarity S_i which represents the similarity of the note information i from the number of elements Nu_i in the sum set of the set W_i and the set W according to:

$$S\_i = \frac{\sum_{w \in W\_i}^{W\_i} f(w, W)}{Nu\_i}.$$

7. The apparatus according to claim 1,
wherein max( ) is defined as a function which returns a maximum value among arguments, and
wherein determining the similarity between the context information extracted at registration and the extracted context information at the certain point in time includes determining the similarity S_i which represents the similarity of respective n pieces of saved note information i (where i=1, 2, ..., n) and thereafter calculates a value S'_i which is a normalization of the similarity S_i according to:

$$S'\_i = \frac{S\_i}{\max(S\_1, S\_2, \ldots, S\_n)},$$

and wherein the display device displays the one or more saved note information in a display mode that is determined based on the value S'_i which is a normalization of the similarity S_i.

8. The apparatus according to claim 1,
wherein the display device displays a display area for the one or more saved note information with a level of transparency which depends on the one or more saved similarity of the note information.

9. The apparatus according to claim 1,
wherein the display device displays a display area for the one or more saved note information in a size that depends on the similarity of the one or more saved note information.

10. The apparatus according to claim 1,
wherein the display device displays only note information whose similarity is greater than or equal to a certain threshold value in a display mode that is determined based on the similarity among pieces of saved note information.

11. An apparatus which displays various types of information, the apparatus comprising:
a processor configured to perform the functions of
monitoring a state of the apparatus and extracting context information indicative of the state, the context information including window composition information which is information that identifies a window screen contained in a screen being displayed on the apparatus;
saving one or more note information in association with a context information extracted at registration when the note information for displaying is registered;
determining, for each piece of the one or more saved note information, similarity between the extracted context information extracted at a certain point in time and the context information extracted at registration which is associated with the one or more saved note information; and
a display device for displaying the one or more saved note information in a display mode in accordance with the determined similarity,
wherein a set of window screens which are indicated in the window composition information extracted at the certain point in time is defined as W, and a set of window screens which are indicated in the window composition information associated with note information i, which is included in the one or more saved note information, is defined as W_i, and
wherein determining the similarity between the context information extracted at registration and the extracted context information extracted at the certain point in time includes calculating similarity S_i representing the similarity of the note information i from a number of elements N_i in the set W and the number of elements Ni_i in a product set of the set W_i and the set W according to:

$$S\_i = \frac{Ni\_i}{N\_i}.$$

12. An apparatus which displays various types of information, the apparatus comprising:
a processor configured to perform the functions of
monitoring a state of the apparatus and extracting context information indicative of the state, the context information including window composition information which is information that identifies a window screen contained in a screen being displayed on the apparatus;
saving one or more note information in association with the context information extracted at registration when the note information for displaying is registered;
determining, for each piece of the one or more saved note information, similarity between the extracted context information extracted at a certain point in time and the context information extracted at registration which is associated with the saved note information; and
a display device for displaying the one or more saved note information in a display mode in accordance with the determined similarity,
wherein a set of window screens which are indicated in the window composition information extracted at the certain point in time is defined as W, and a set of window screens which are indicated in the window composition information associated with note information i, which is included in the one or more saved note information, is defined as W_i, and
wherein determining the similarity between the context information extracted at registration and the extracted context information extracted at the certain point in time includes calculating similarity S_i representing the similarity of the note information i from the number of elements Nu_i in a sum set of the set W_i and the set W and the number of elements Ni_i in the product set of the set W_i and the set W according to:

$$S\_i = \frac{Ni\_i}{Nu\_i}.$$

* * * * *